United States Patent [19]

Moszkowski

[11] Patent Number: 4,707,879
[45] Date of Patent: Nov. 24, 1987

[54] DEVICE FOR ACTING ON AND TREATING SURFACES, FOR INSTANCE FOR PICKING UP PARTICLES, LEAVES AND LITTER

[76] Inventor: Stefan J. Moszkowski, Lomvägen 315, S-191 56 Sollentuna, Sweden

[21] Appl. No.: 786,964

[22] PCT Filed: Feb. 5, 1985

[86] PCT No.: PCT/SE85/00053
§ 371 Date: Oct. 8, 1985
§ 102(e) Date: Oct. 8, 1985

[87] PCT Pub. No.: WO85/03498
PCT Pub. Date: Aug. 15, 1985

[30] Foreign Application Priority Data

Feb. 10, 1984 [SE] Sweden ............................... 8400726

[51] Int. Cl.⁴ ............................................. A47L 5/14
[52] U.S. Cl. ........................................ 15/345; 15/346
[58] Field of Search ........................... 15/345, 346, 397

[56] References Cited

U.S. PATENT DOCUMENTS

| 789,768 | 5/1905 | Sullivan | 15/345 |
| 2,238,541 | 4/1941 | Spagnolo | 15/397 |
| 3,238,557 | 3/1966 | Foster | 15/345 |
| 3,331,091 | 7/1962 | Foster | 15/345 |
| 3,956,790 | 5/1976 | Ishiwata et al. | 15/345 |

FOREIGN PATENT DOCUMENTS

| 167076 | 2/1956 | Australia | 15/345 |
| 163309 | 9/1905 | Fed. Rep. of Germany . | |
| 534298 | 9/1931 | Fed. Rep. of Germany | 15/345 |

Primary Examiner—Ronald Feldbaum

[57] ABSTRACT

A device for acting on or treating surfaces by a medium, preferably air, which is supplied to the device via one or several inlets and is sucked away through one or several outlets. The device comprises at least one vortex chamber (10) whose inner envelope surface (11) is so designed that the medium entering through the inlets (20) is circulated in the chamber and acts on the treatment surface (13) through an opening (12) provided in the envelope surface (11) and directed to the treatment surface (13). The axis (17) about which the medium is circulated is parallel to the treatment surface (13).

11 Claims, 17 Drawing Figures

DEVICE FOR ACTING ON AND TREATING SURFACES, FOR INSTANCE FOR PICKING UP PARTICLES, LEAVES AND LITTER

This invention relates to a device for acting on or treating surfaces by a medium, preferably air, which is supplied to the device via one inlet or several inlets and is sucked away through one outlet or several outlets.

In particular, a device according to the invention can be used as a suction nozzle for picking up material, such as dust, gravel, leaves, garbage, and heat and moisture or the like from surfaces or for cleaning surfaces by means of quickly rotating particles mixed with air or for treatment of surfaces by adding air-borne particles, such as paint powder, or gases.

Known devices of the above type have several drawbacks. For instance when taking up particle matter for pneumatic conveying there is a need for a large quantity of exhaust air and large sub-atmospheric pressures in order to achieve sufficient flow velocity for removal of heavy particles, such as cement and corn. The nozzles presently used are so designed that a uniform distribution of the inflow velocity is dependent on the shape of the surface of the material and the local geometry.

Using known devices means that it is difficult on uneven surfaces to pick up and remove for instance solid, air-borne particles, dust, heat and so on or larger particles, such as litter, leaves or garbage. The devices work well only when the outlet ports are smooth and narrow, and they need smooth surfaces, large sub-atmospheric pressure, high air speed and comparatively large flows, which means large power consumption. Furthermore, they are of a rather complicated design and are provided with particular inner baffle plates to equalize the air inlet flow. Because the ports are narrow these devices will easily clog, and the field of application is limited. Moreover, particles of large size, as leaves or garbage, can cause stoppage.

Known devices for spreading air-borne particles, for instance paint powders, are used in electrostatic spraying processes. The powder paint is sprayed onto electrostatically charged details, sometimes by several spray guns. A fraction of the paint, which is also electrostatically charged, adheres to the details but the major part falls down and is conveyed to a recovery system. A device according to the invention can be used as a vortex chamber for spreading the pulverulent particles uniformly in the chamber and it makes it possible to apply paint powder to large surfaces. The cloud of paint will be kept rotating in the zone enclosed by the vortex chamber which will be exposed to a low sub-atmospheric pressure.

The object of the device according to the invention is preferably to provide a feeding nozzle which is built-up according to the push-pull principle and which is far less sensitive than known nozzles since the inflow velocity is created by means of a compressed-air jet. Thus, a surface covered by particle matter need not be smooth for an even inflow velocity to be obtained. Because of the favourable aerodynamic shape and the function of the nozzle according to the invention the power ratio when using the same input power will be much larger than in the known nozzles.

The characteristics of the device according to the invention will appear in the following claims.

The advantages of a device according to the invention are that because of the push-pull principle the device is not sensitive to unevenness of the surface and thus, an even inflow velocity is achieved independently of the condition of the surface. Further, the device works effectively also by using wide openings so that also large particles easily can be sucked into the nozzle.

A low sub-atmospheric pressure is sufficient for picking up and removing particles, and there is no need for large flows for removing the particles. The power consumption of the device according to the invention when used as a suction nozzle is low and the construction is simple, insensitive and reliable in operation. It cannot be clogged because its function is not dependent on ports which are small. A device according to the invention designed as a suction nozzle has a wide area of use since the same nozzle can be used both for large and small particles. There will be no sudden breaks in operation caused by large particles or adhering litter. A device according to the invention has a low noise level and is reliable in operation because of the comparatively low values of the pressure on the suction side. A nozzle according to the invention can readily be equipped with an additional feeding nozzle, for instance for solid cleaning agents, working by friction, such as saw dust. The saw dust particles can rotate several times in the vortex chamber before leaving through a suction spigot. The cleaning agent is preferably fed as far away as possible from the suction spigot, for instance through an opposite side wall. Finally, a suction nozzle according to the invention can be used for evacuating moisture, for instance for drying moving paper or textile webs. In so-called air float dryers it is known to use the so-called Coanda-effect combined with direct evaluation of the moisture through an evacuation opening. However, this involves great adjustment problems due to the great demand for a uniform velocity of the inflow air and also of the exhaust flow of moist air. A device according to the invention used as a heat transfer nozzle is air float dryers is less sensitive to velocity variations than traditional nozzles.

The air in a vortex chamber rotates at high velocity and creates a zone of sub-atmospheric pressure in the entire chamber. The web which is treated will float tangentially and parallel to the zone of drying rotating air. The rapidly rotating air causes adherence of the floating web because of ejection effects. The moist air will be pressed tangentially to the outlet port. This also means that the moist air evacuation system becomes less sensitive to interruptions, for instance uneven paper web or non-uniform distribution of the sub-atmospheric pressure in the slot or port. The pressure slot can be placed in the interior of the vortex chamber, and velocity interruptions will be automatically reduced by an axial velocity equalization because of the friction forces between different stream lines in adjacent sections of the circulating zone.

The invention can also be used for conveying material on an air cushion for reducing friction forces, the vortex serving also as a driving means for the material.

The invention will now be described by way of example with reference to the accompanying drawings which schematically show different embodiments of the invention.

Figure 1:
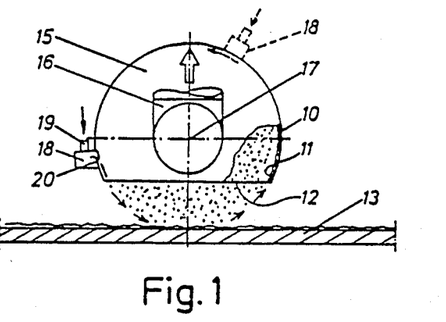
FIG. 1 is a side elevation of a first embodiment of the invention.
Figure 2:
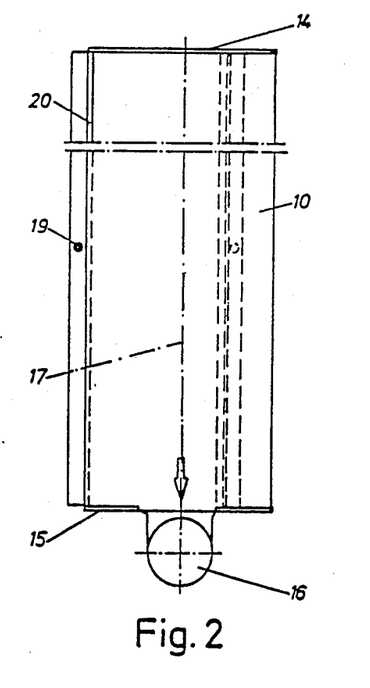
FIG. 2 is a top view of the device of FIG. 1.

The embodiment according to FIGS. 1 and 2 is a nozzle for picking up for instance particle matter, litter and dust. It comprises a vortex chamber 10 which is a circular cylinder having a concave inner envelope surface 11 with an opening 12 directed to the surface 13 to be treated. The cylinder has two side walls 14, 15 of which one wall 15 has a suction spigot 16 to be connected to an evacuation device, not shown. The suction spigot 16 is an outlet for the particles picked up by means of the device, and the outlet is placed at an imagined axis 17 which is the centre of the vortex.

In the vortex chamber 10 and/or outside it one or more than one pressure chambers 18 are connected via a nipple 19 to a suitable pressure generating device. The pressure chamber 18 supplies a pressurized medium, such as air, to the vortex chamber by one slot 20 or several slots or nozzles which direct the jet of compressed air tangentially to the periphery of the vortex chamber 10. Compressed air leaving the pressure chamber 18 through the inlet slot 20 acts on the air in the interior of the vortex chamber and creates a strong vortex flow similar to the flow in a cyclone. The vortex core created along the axis 17 of the vortex chamber 10 is capable of drawing in particles which are picked up from the surface 13 by means of the air flow. This depends on the high value of the sub-atmospheric pressure prevailing in the core of the vortex. The surface 13 being treated is placed tangentially relative to the periphery of the circulating air and is parallel to the imagined axis 17 of the vortex chamber 10.

Figure 3:
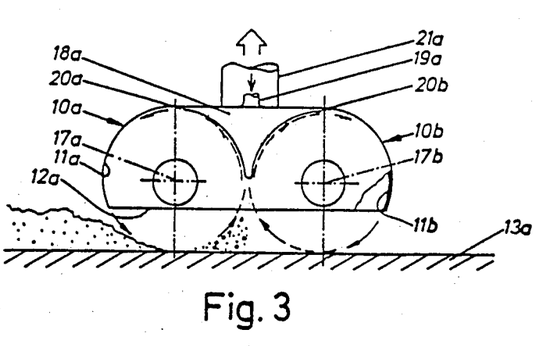
FIG. 3 is a side elevation of a second embodiment of the invention.
Figure 4:
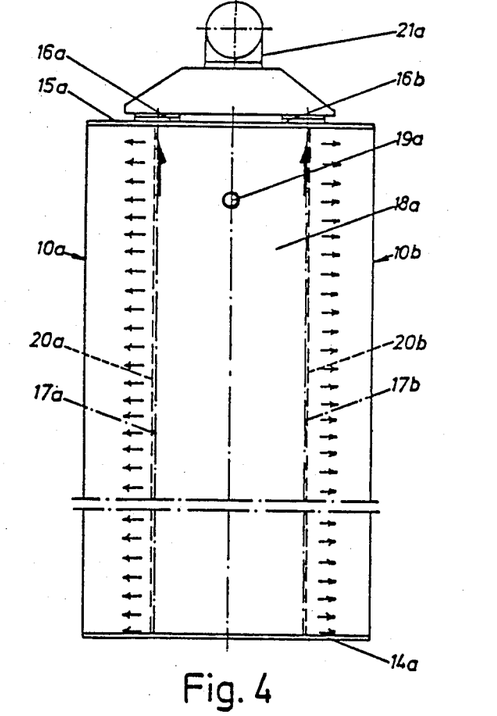
FIG. 4 is a top view of the device of FIG. 3.

In the alternative embodiment shown in FIGS. 3 and 4, the nozzle comprises two parallel vortex chambers 10a, 10b placed close to one another and partly separated by a pressure chamber 18a, which via a nipple 19a is connected to a compressed-air source. From the pressure chamber 18a the air flows via slots 20a, 20b which are parallel to the axes 17a, 17b into each vortex chamber 10a, 10b tangentially to the concave envelope surface 11a, 11b. The flow is so directed that two counter-rotating vortices are created.

At each end the two chambers 10a, 10b have a common side wall 14a, 15a, of which one side wall 15a is provided with an outlet spigot 16a, 16b placed at the centre of the chamber. These spigots continue via a common connection 21 to a suction conduit connected to a fan, not shown, or to another evacuating device. As in the embodiment previously shown, the nozzle is provided with an opening 12a through which the particles are conveyed from the surface 13a.

It is also possible to place one fan or several fans directly in the spigots 16a, 16b in order to grind larger objects, such as branches, entering into the nozzle.

Figure 5:
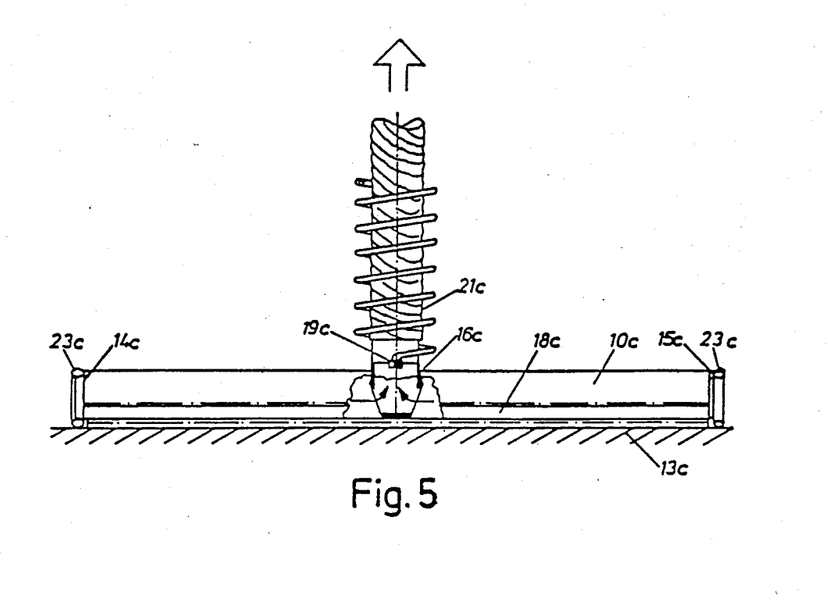
FIG. 5 is a partly broken front view of a third embodiment.
Figure 6:
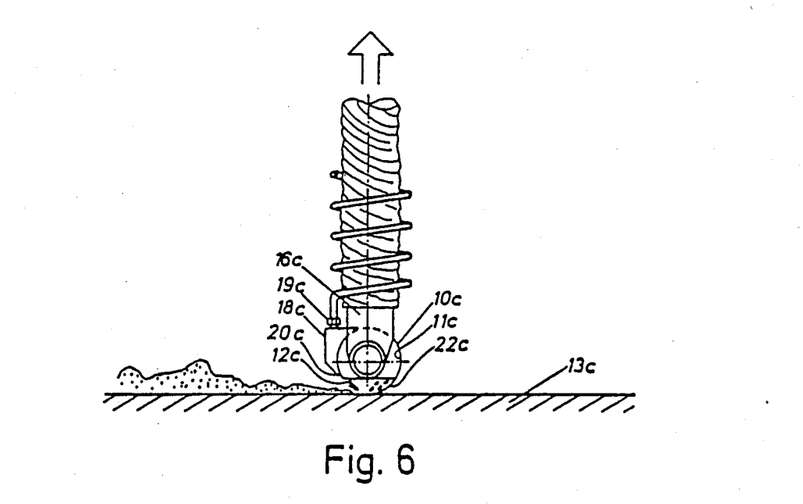
FIG. 6 is a side elevation of the device of FIG. 5.

The embodiment of a nozzle shown in FIGS. 5 and 6 comprises as the example of FIGS. 1 and 2, a vortex chamber 10c having an inner concave envelope surface 11c and an outer pressure chamber 18c which via a nipple 19c is connected to a compressed-air source. The pressure chamber 18c extends over the entire nozzle and close to the opening 12c has a slot 20c through which air is blown tangentially relative to the periphery of the vortex. In this case, the outlet spigot 16c is mounted centrally to the nozzle and has two openings each one directed to a side wall 14c and 15c, respectively. The spigot 16c is via a hose 21c connected to an evacuating device. The nozzle also has a guide 22c, for instance of rubber, bristles or plastics, for directing the periphery flow and the particles into the vortex chamber 10c. The design of the nozzle is such that parallel movement over the surface 13c is facilitated. This is achieved by means of a sliding device 23c or by wheels placed at each side wall.

Figure 7:
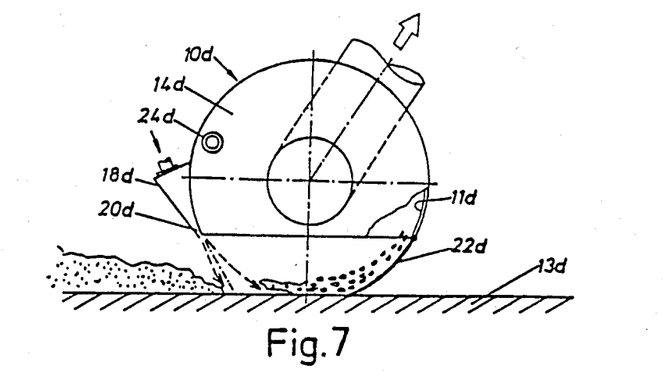
FIG. 7 is a side elevation of a fourth embodiment.
Figure 8:
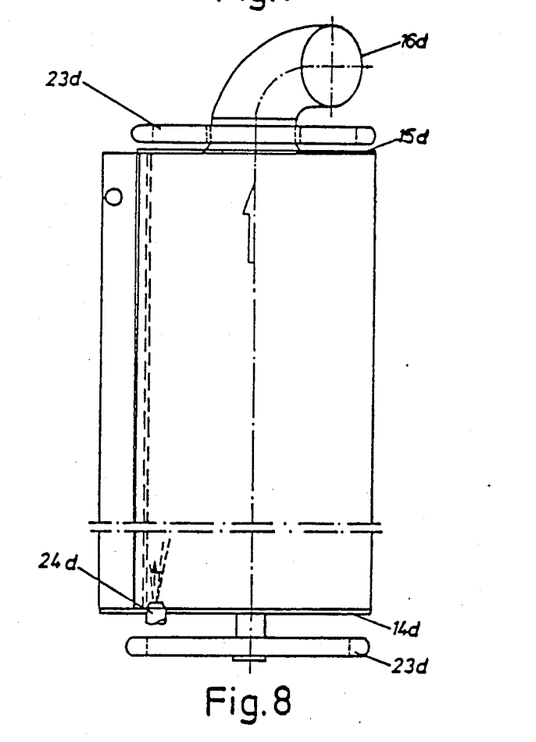
FIG. 8 is a top view of the device shown in FIG. 7.

The nozzle shown in FIGS. 7 and 8 is intended for treating or cleaning of surfaces. As in the previous examples, there is a vortex chamber 10d with a concave inner envelope surface 11d, a pressure chamber 18d with an outlet slot 20d, side walls 14d, 15d and an outlet spigot 16d placed at one side wall 15d. Moreover, there are wheels 23d and a guide 22d. The other side wall 14d has a nozzle 24d for supplying a cleaning agent of friction type, for instance saw dust. The agent supplied by the nozzle 24d will be integrated with the vortex created in the vortex chamber and by friction clean the surface 13d before leaving through the outlet spigot 16d, which as in the previous examples is connected to a vacuum creating device.

Figure 9:
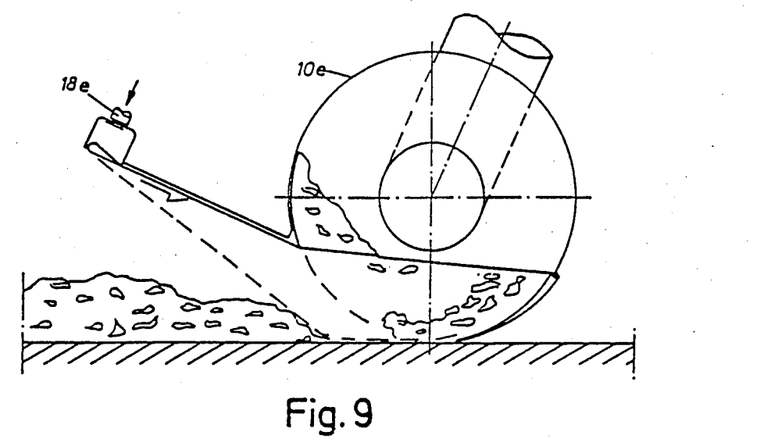
FIG. 9 is a side elevation of a fifth embodiment.

The nozzle shown in FIG. 9 differs from the nozzle of FIGS. 7 and 8 mainly by the fact that the pressure chamber 18e is placed at a distance from the vortex chamber 10e in order to increase the area being treated. The direction of the air jet, however, is still tangential to the vortex periphery.

Figure 10:
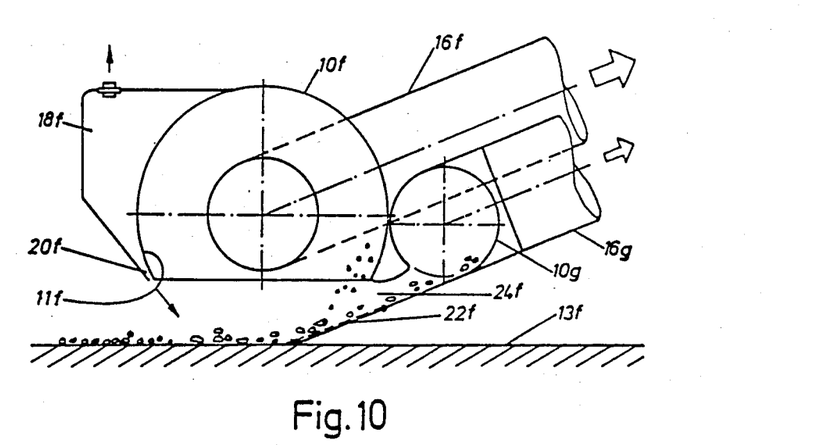
FIG. 10 is a section of a nozzle intended to separate particles which are picked up.

The nozzle shown in FIG. 10 comprises, as in the previous examples, a vortex chamber 10f having an inner concave envelope surface 11f, an outlet spigot 16f, a guide 22f and a pressure chamber 18f with a slot 20 through which the compressed air flows. The vortex chamber 10f is connected to a collecting chamber 10g, which is parallel to the chamber 10f, via an opening 24f, and this chamber is via a separate outlet spigot 16g connected to an evacuating device, not shown.

The nozzle works in the following manner.

By the vortex created in the vortex chamber 10f light air-borne particles are conveyed to the outlet spigot 16f when the nozzle is moved over a surface 13f, whereas the remaining, heavy particles via the opening 24f are fed by the centrifugal force into the chamber 10g.

Figure 11:
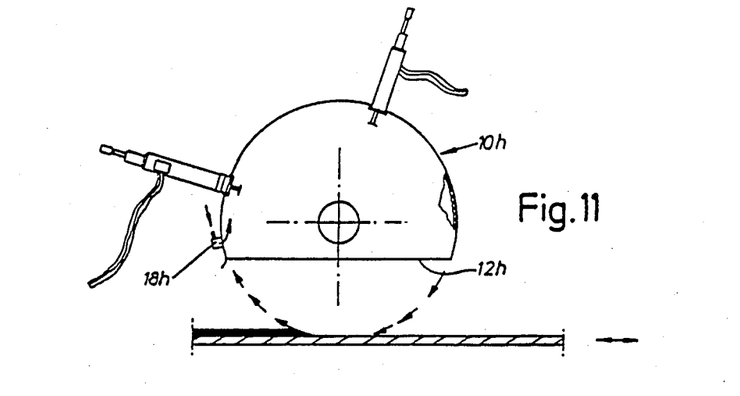
FIG. 11 shows in section an embodiment used as a vortex chamber for spreading aerosols, such as paint powder, solid particles or gases, onto a surface.
Figure 12:
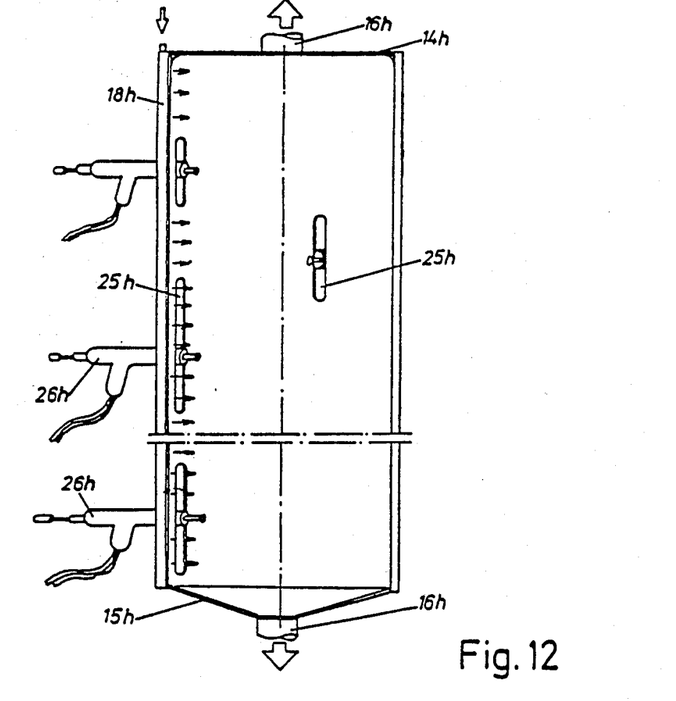
FIG. 12 is a bottom view of the device of FIG. 11.

The nozzle shown in FIGS. 11 and 12 is intended for electrostatic spraying and comprises a vortex chamber 10h with side walls 14h, 15h. Each side wall has an outlet spigot 16h and the side wall 15h is of conical shape in order to collect excess paint when the chamber is turned to the vertical position. The envelope surface of the vortex chamber has several slots 25h in which spray guns 26h can be moved sideways. As in the examples previously shown the outlet spigot 16h is connected to an evacuating device whereas the pressure chamber 18h is connected to a pressure creating device.

Figure 13:
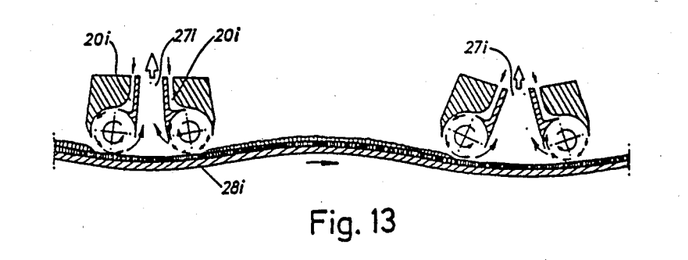
FIG. 13 shows in section an embodiment of a vortex chamber used as a nozzle for picking up and removing moisture from moving webs, for instance of paper or textile.
Figure 14:
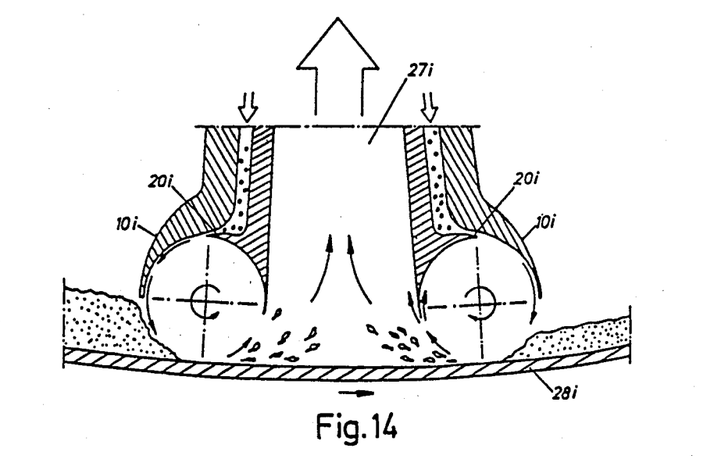
FIG. 14 shows the vortex chamber of FIG. 13 more in detail.

The device according to the invention can also be used as an air float dryer nozzle in processes such as laminating, impregnating, coating of paper, plastic film, metal foil, textiles. This is illustrated in FIGS. 13 and 14. The device shown is a nozzle of air float type. Several parallel vortex chambers 10i are used. These chambers are spaced away from one another so as to form an evacuating port 27i between them. Heated, dry air is blown through the slots 20i and rapidly rotating air from the vortex chamber meets the moving paper or textile web 28i tangentially and evacuates the moisture through the port 27i. In this way the device can work as a linear suction ejector which acts dynamically on the moist layer and moreover makes the moving web adhere tangentially to the air rotating in the vortex chamber.

Figure 15:
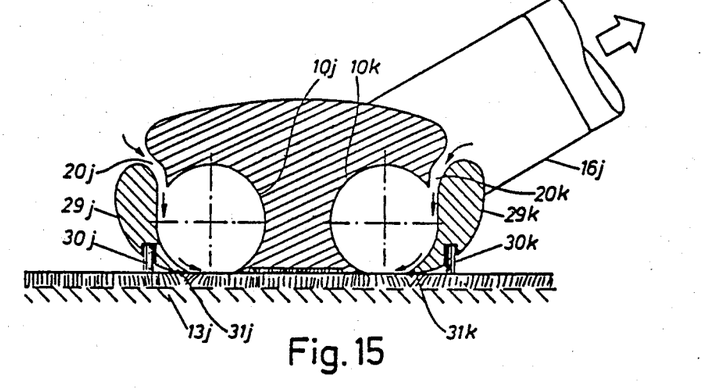
FIG. 15 is a section through a vacuum cleaning nozzle according to the invention.

FIG. 15 shows a vacuum cleaning nozzle having two vortex chambers 10j, 10k connected an outlet spigot 16j. As in the previous examples the outlet spigot is connected to the suction side of a fan or the like. Each vortex chamber exposed to sub-atmospheric pressure has a slot 20j, 20k through which air enters tangentially into the vortex chamber in order to create the two votices which remove dust and litter from the surface 13j through the nozzle to a collecting device. The nozzle has guides 29j, 29k provided with bristles 30j, 30k. The guides can be raised and lowered and are intended to abut the surface 13j of soft material, such as a carpet. When the nozzle is moved over a hard surface the guides are intended to be maintained in their upper position, which means that the air passes between the surface 13j and the guides 29j, 29k whereby the slots 20j, 20k are closed. The guides 29j, 29k are each provided with an edge 31j, 31k in order to scrape off particles from the surface 13j.

It should be noted that although throughout the foregoing description air has been used as the generator of the vortex also other media can be used to achieve the same effect. Thus, it is possible completely or partly to replace the air for instance by water which is allowed to enter through nozzles.

Figure 16:
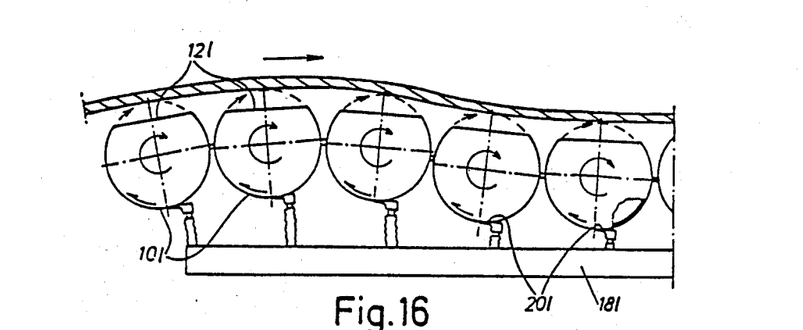
FIG. 16 shows in section a device according to invention when used as a conveyer path with foldable elements.
Figure 17:
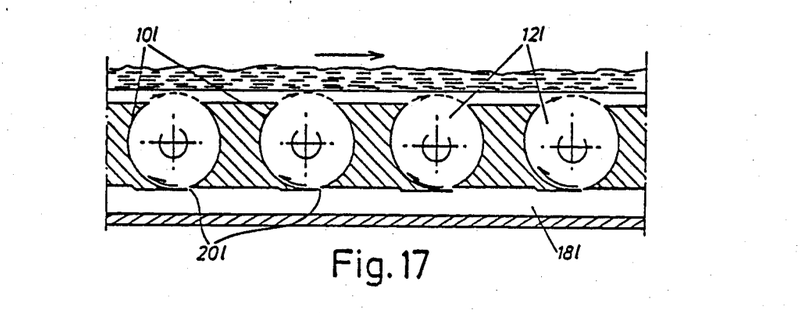
FIG. 17 shows a modification of the device of FIG. 16.

FIGS. 16 and 17 show a particular field of application in which several vortex chambers are used for conveying material by using rotating air cushions which reduce the friction forces and protect the material from damages. The device differs from known devices since it fulfils two functions, viz. to support the material and to act as a driving means therefor.

In the Figures several parallel vortex chambers 10l are shown which are linked (FIG. 16) or fixed (FIG. 17) to one another. Air is supplied through the slots 20l from a compressed-air chamber 18l thereby creating vortices in the chamber 10l. In each vortex chamber 10l there is an opening 12l directed to the plate- or sheet-shaped material to be conveyed. The vortices created in the chambers will support and convey the material in the direction shown by arrows in the Figures.

In the foregoing, some embodiments of a device according to the invention have been described. However, the invention is not limited to these particular embodiments but covers all conceivable embodiments which are within the scope of the claims.

I claim:

1. A device for treating surfaces by means of a medium such as air, which is supplied to the device through at least one inlet and is sucked away through at least one outlet, said device comprising at least one suction chamber having an inner envelope surface which is so constructed that the medium entering through said inlet is circulated in the chamber, said envelope surface being provided with an opening and said medium acting on the treatment surface through said opening characterized in that
   (a) said suction chamber is a vortex chamber substantially forming a part of a circular cylinder having a central axis which is substantially parallel to the treatment surface,
   (b) said outlet being situated so as to effect an axial outflow along said central axis and a well-defined rotating vortex around said central axis, and
   (c) the periphery of said rotating vortex having a full circular cylindrical configuration centered around said central axis, so that the treatment surface is tangential to said cylindrical configuration.

2. A device according to claim 1, characterized in that said inlet is connected to a compressed air source.

3. A device according to claim 2, characterized in that said inlet is so directed that the inlet flow is mainly tangential to the peripheral of said vortex.

4. A device according to claim 3, characterized in that said inlet is elongated and parallel to said central axis.

5. A device according to claim 3, characterized in that said inlet is located outside the vortex chamber so as to increase the impingement area on the treatment surface which is acted upon dynamically.

6. A device according to claim 1, characterized in that said outlet is located on said central axis.

7. A device according to claim 1, characterized by two adjacent vortex chambers in which vortices having counter-directed flows are created.

8. A device according to claim 1 further comprising a flexible guide and in that the vortex chamber is provided with said flexible guide for guiding the air and particles from the treatment surface to the vortex chamber.

9. A device according to claim 1 further comprising distance means keeping the device in a predetermined position above the treatment surface.

10. A device according to claim 8, characterized in that said distance means are wheels or sliding means which facilitate movement and keep the device parallel to the surface.

11. A device according to claim 1, wherein the vortex chamber has at least one nozzle for supplying said medium.

* * * * *